United States Patent [19]

Kalmanson

[11] 4,426,098

[45] Jan. 17, 1984

[54] HEAD ASSEMBLY FOR A TOWING DEVICE

[76] Inventor: Samuel Kalmanson, 8320 SW. 23 St., Miami, Fla. 33155

[21] Appl. No.: 346,293

[22] Filed: Feb. 5, 1982

[51] Int. Cl.³ .............................................. B60D 1/00
[52] U.S. Cl. .................................... 280/504; 280/507; 292/257; 403/18; 403/323; 403/354
[58] Field of Search ............... 280/504, 505, 506, 507, 280/508, 510, 511, 493, 443, 442, 455, 452, 449; 292/259; 403/323, 374, 409, 18, 354; 279/97; 213/77, 78, 79, 80, 85, 86, 92, 99, 141–149, 174, 179, 180, 182, 183, 184

[56] References Cited

U.S. PATENT DOCUMENTS

| 2,194,138 | 3/1940 | Crawford ......................... 292/257 X |
| 2,639,160 | 5/1953 | Studebaker et al. ................. 280/495 |
| 3,180,667 | 4/1965 | Auboin et al. ................... 280/510 X |
| 3,712,642 | 1/1973 | Burroughs ......................... 280/504 |

FOREIGN PATENT DOCUMENTS 655069 1/1938 Fed. Rep. of Germany ...... 280/508
659456 10/1951 United Kingdom ............... 280/511

Primary Examiner—Joseph F. Peters, Jr.
Assistant Examiner—Mitchell J. Hill
Attorney, Agent, or Firm—John Cyril Malloy

[57] ABSTRACT

An improved head assembly for a towing device for use in connecting to an aircraft to tow the same, said assembly including a body having a central operating opening therethrough and a communicating downwardly opening recess for hooked-up engagement with the towing bracket of an aircraft and wherein a cam is swingably carried in the operating chamber with a portion adapted for rotation into and out of closing relation of the downwardly facing recess to captivate a towing bracket of an aircraft.

6 Claims, 4 Drawing Figures

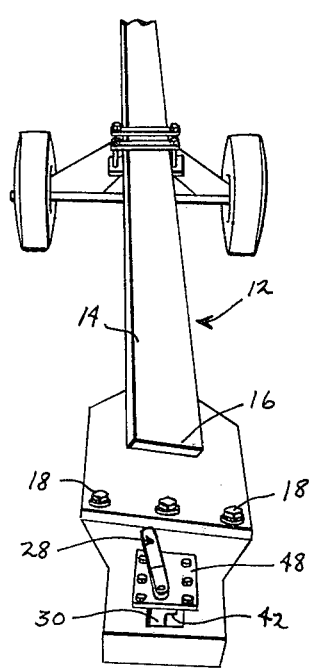
Fig.1
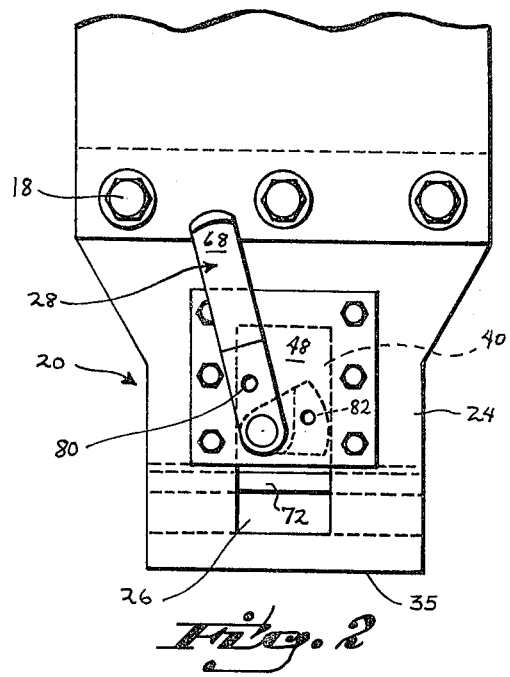
Fig.2
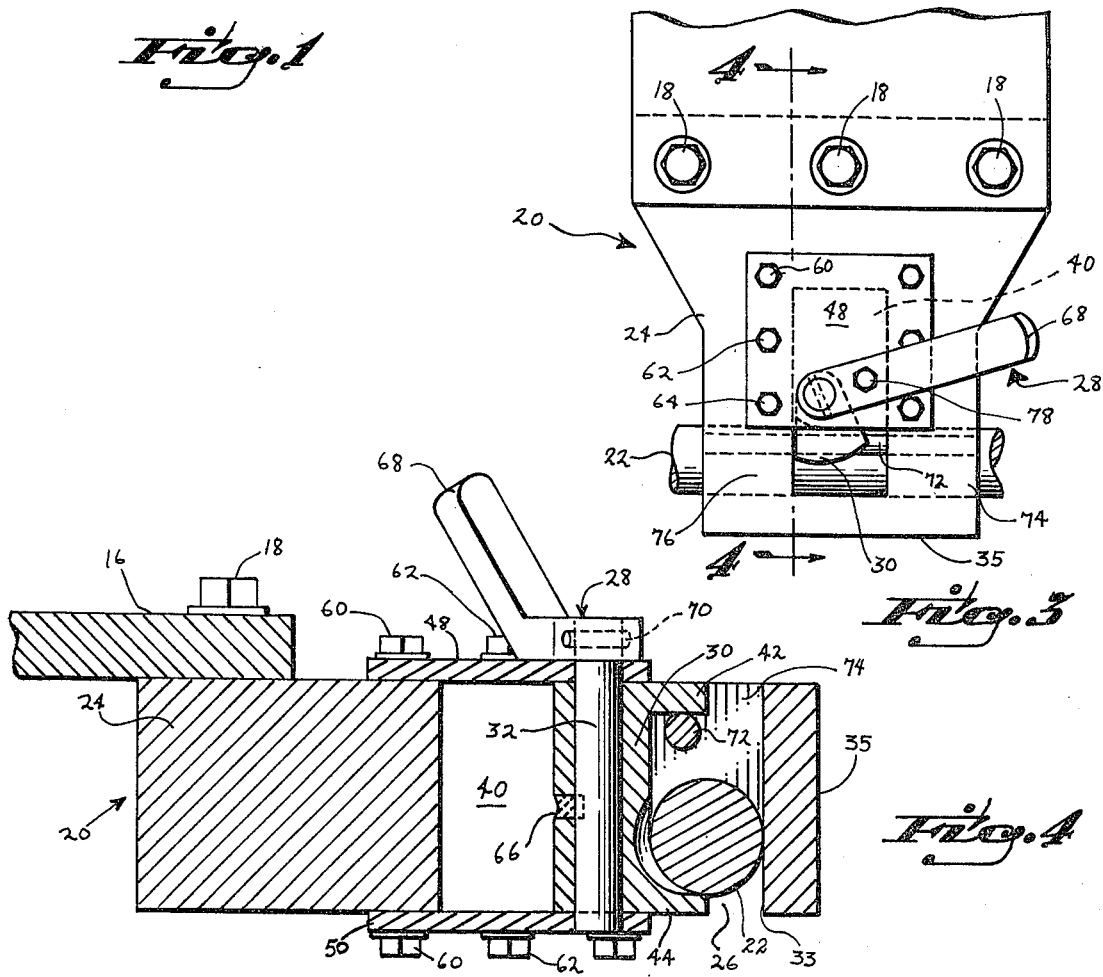
Fig.3
Fig.4

HEAD ASSEMBLY FOR A TOWING DEVICE

FIELD OF THIS INVENTION

This invention relates to towing devices for aircraft and more particularly to an improved head assembly for a towing device for aircraft.

OBJECTS OF THIS INVENTION

It is an object of this invention to provide an improved head assembly for use on a towing device to adapt it for connection to an aircraft towing bracket and wherein a cam operated member is swingable into and out of closing relation to a recess in the body of the head assembly which is adapted for hooked-up engagement with a towing bracket.

It is a general object of this invention to provide a device of the type described which is simple in construction, inexpensive to manufacture and is strong and durable and well adapted for the purposes for which it is intended.

In accordance with these and other objects which will become apparent hereinafter, the instant invention will now be described with reference to the accompanying drawings in which:

DESCRIPTION OF THE DRAWINGS

FIG. 1 is a perspective view of a towing device in combination with the head assembly of the instant invention for towing an aircraft;

FIG. 2 is a partial view illustrating a top plan view of the head assembly of the instant invention prior to attachment to the towing bracket of an aircraft;

FIG. 3 is a view similar to FIG. 2 and illustrating the head assembly in hooked-up engagement with a towing bracket of an aircraft;

FIG. 4 is a view in cross section taken on the plane indicated by the line 4—4 of FIG. 3 and looking in the direction of the arrows.

DESCRIPTION OF THE PREFERRED EMBODIMENT

Referring to the drawings, the numeral 12 represents a towing device composed of a tongue 14 with an end 16 adapted to be connected as by the bolts 18 to an improved towing head assembly 20 which is the subject of this application. When installed on a towing device, it is adapted for hooked-up engagement with a towing bracket 22 of an aircraft.

The head 20 is comprises a body 24 including a substantially hook configuration and having a bottom opening recess 26 structured to receive the towing bracket 22 therein. A lever operated cam assembly is generally indicated as 28 and includes a cam 30 rotatable on a pin 32, serving as a cam shaft, into and out of abutting hooked-up relation with a towing bracket 22 of an aircraft or other vehicle. The hooked-up position of the cam 30 in relation to the body 24 is shown in FIGS. 3 and 4; the unhooked position is shown in FIG. 2.

The body 24 has a main operating through opening or chamber 40 integrally formed therein and in which the cam is rotatably disposed for swinging movement on the pin 32 from the position shown in FIG. 2 to the positions shown in FIGS. 3 and 4. More specifically, when the cam 30 is rotated into its "hooked-up" position, towing bracket 22, already disposed within recess 26, is forced into fixed engagement with the inner surface 33 of depending flange 35. The cam 30 has an exterior surface 16 portion configured to include spaced apart lower and upper lips 42 and 44 respectively which at least partially surround and captivate the inserted towing bracket 22. The operating opening is effectively closed, to prevent collection of debris and the like therein, by an upper plate and a lower plate 48 and 50 respectively, which are bolted to the body 24 as at 60, 62, and 64. The cam pin 32 is rotatable in holes provided through the plates and is keyed as at 66 to the cam so as to rotate therewith. A lever-type cam operator 68 is attached to cam pin 32 by a pin 70 exteriorly accessible of the head assembly so as to effect rotation of the cam 30 into and out of locking position relative to towing bracket 22. In the preferred embodiment illustrated, a bearing shaft 72 is disposed in interconnecting relation between the side walls 74 and 76 and extends across the open portion of the operating chamber 40. The shaft 72 is disposed on the interior of the recess 26 contiguous the undersurface of side walls 74 and 76 which define integral spaced apart portions of body 24. The bearing shaft is thereby disposed to add strength to the overall structure of body 24.

In use, the head 20 is attached to a towing device 12 as seen in FIG. 1. The head assembly 20 is hooked up to an aircraft towing bracket 22, see FIGS. 3 and 4. To do this, the lever operated cam 30 is rotated into the position shown in FIG. 3 and FIG. 4 by manual movement of lever 68. When in this position, a bolt 78 is passed through a hole 80 in the lever 68 (FIG. 2). The distal end of bolt 78 passes into a hole 82 of the plate 48. This is done to prevent movement of lever 68 and thereby locks the device. To unlock the assembly the bolt is first removed and rotation of the lever 28 is allowed. Other types of locking means may be utilized.

While the instant invention has been shown and described herein in what is conceived to be the most practical and preferred embodiment, it is recognized that departures may be made therefrom within the scope of the invention, which is therefore not to be limited to the details disclosed herein ut is to be accorded the full scope of the claims so as to embrace any and all equivalent appartus and articles.

What is claimed is:

1. A head assembly of the type primarily designed for mounting on a towing device, said head assembly comprising:
    (a) a body means having an operating chamber formed therein, recess means including a recess formed in said body means and extending across a portion thereof and into communicating relation with said operating chamber; said recess dimensioned to receive a a towing bracket therein;
    (b) said body further comprising two side wall portions disposed in spaced apart relation to one another and in communicating relation to said recess; a bearing shaft mounted in interconnecting relation between said two side wall portions and in communication relation with said recess, whereby strength is added to said head assembly,
    (c) cam means including a cam movably mounted within said operating chamber and rotatably positionable into and out of said recess in abutting relation with a towing bracket received therein, said cam including an exterior surface portion disposed and configured to at least partially captivate a towing bracket received within said recess;

(d) said cam means further including a cam shaft journaled to said body for rotation relative thereto and fixedly secured to said cam for rotation therewith, whereby said cam is selectively rotatable into and out of locking relation to a towing bracket within said recess thereby connecting and disconnecting a towing device to the towing bracket.

2. A head assembly as in claim 1 wherein said exterior surface portion comprises at least one lip extending outwardly from said cam and disposable into and out of substantially closing relation to said recess and captivating relation to a towing bracket within said recess.

3. A head assembly as in claim 2 wherein said cam includes an upper lip and a lower lip disposed to close said recess and at least partially surround a towing bracket within said recess when said cam is rotated into its locking relation to the towing bracket.

4. A head assembly as in claim 1 further comprising a lever operator connected to said cam means to rotate with said cam and extending exteriorly of said body for ready access thereto, whereby rotation of said lever operator causes rotation of said cam into and out of communicating relation with said recess.

5. A head assembly as in claim 4 further comprising lock means including a first aperture formed in said lever operator and a second aperture formed in a structure fixed relative to said body, said first aperture positionable into aligned relation with said second aperture upon rotation of said lever operator, bolt means disposable in extended relation through both said first and second aperture when so aligned, whereby rotation of said lever operator and said cam is prevented.

6. A head assembly as in claim 1 wherein said body includes a first plate and a second plate disposed in at least partially closing relation to said operating chamber, said plates being disposed in overlaying relation to opposite ends of said operating chamber.

* * * * *